(12) United States Patent
Suzuki et al.

(10) Patent No.: US 11,011,059 B2
(45) Date of Patent: May 18, 2021

(54) VEHICLE CONTROL DEVICE

(71) Applicant: HONDA MOTOR CO., LTD., Tokyo (JP)

(72) Inventors: Toshifumi Suzuki, Wako (JP); Hiroshi Miura, Wako (JP); Suguru Yanagihara, Wako (JP); Marina Saikyo, Wako (JP); Shogo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 157 days.

(21) Appl. No.: 16/289,945

(22) Filed: Mar. 1, 2019

(65) Prior Publication Data

US 2019/0272754 A1 Sep. 5, 2019

(30) Foreign Application Priority Data

Mar. 2, 2018 (JP) .............................. JP2018-037103

(51) Int. Cl.
*G08G 1/16* (2006.01)
*B60W 10/20* (2006.01)
*B60W 10/18* (2012.01)
*B60W 30/12* (2020.01)

(52) U.S. Cl.
CPC ............... *G08G 1/16* (2013.01); *B60W 10/18* (2013.01); *B60W 10/20* (2013.01); *B60W 30/12* (2013.01); *B60W 2520/10* (2013.01); *B60W 2554/00* (2020.02); *G05D 2201/0213* (2013.01)

(58) Field of Classification Search
CPC ...... B60W 10/04; B60W 10/18; B60W 10/20; B60W 2420/42; B60W 2420/52; B60W 2420/62; B60W 2520/10; B60W 2520/2554; B60W 2520/00; B60W 2555/60; B60W 30/10; B60W 30/12; B60W 30/18163; G05D 2201/0213; G06K 9/00791; G08G 1/16; G08G 1/166; G08G 1/167
See application file for complete search history.

(56) References Cited

U.S. PATENT DOCUMENTS

| | | | |
|---|---|---|---|
| 9,702,098 B1 * | 7/2017 | King | G08G 1/0116 |
| 9,802,614 B1 * | 10/2017 | Yoon | B60W 30/18163 |
| 10,181,266 B2 * | 1/2019 | Gupta | B60Q 9/008 |
| 10,318,821 B2 * | 6/2019 | Kim | B60W 30/18154 |
| 2005/0015203 A1 * | 1/2005 | Nishira | G08G 1/167 701/301 |
| 2005/0209764 A1 * | 9/2005 | Schroder | G01S 13/931 701/93 |

(Continued)

FOREIGN PATENT DOCUMENTS

JP 4225189 B2 2/2009

*Primary Examiner* — Tyler J Lee
(74) *Attorney, Agent, or Firm* — Carrier Blackman & Associates, P.C.; Joseph P. Carrier; Jeffrey T. Gedeon (57) ABSTRACT

In the case of recognizing a traffic regulation which determines that the priority of a first lane is higher than the priority of a second lane, and in the case of determining a state in which another vehicle is in compliance with the traffic regulation, and then determining that the other vehicle is not complying with the traffic regulation, a vehicle control device carries out at least one of a travel control in which a travel position of a host vehicle is moved in a direction of a side opposite to the second lane, and a travel control in which acceleration is not performed.

8 Claims, 4 Drawing Sheets

(56) References Cited

U.S. PATENT DOCUMENTS

| | | | | |
|---|---|---|---|---|
| 2011/0276258 A1* | 11/2011 | Miyakoshi | ........ | B60W 30/0956 |
| | | | | 701/117 |
| 2012/0101728 A1* | 4/2012 | Kudo | ................ | G01C 21/3461 |
| | | | | 701/540 |
| 2013/0191005 A1* | 7/2013 | Hrovat | ................ | F02N 11/0837 |
| | | | | 701/102 |
| 2014/0343830 A1* | 11/2014 | Elwart | ................ | F02N 11/0818 |
| | | | | 701/112 |
| 2016/0176341 A1* | 6/2016 | Raghu | ............ | B60W 30/18154 |
| | | | | 348/148 |
| 2016/0347324 A1* | 12/2016 | Yoshitomi | ............. | B60W 50/14 |
| 2017/0190334 A1* | 7/2017 | Zelman | ............ | G08G 1/096783 |
| 2018/0276989 A1* | 9/2018 | Braeuchle | .......... | G08G 1/09623 |

* cited by examiner

VEHICLE CONTROL DEVICE

CROSS-REFERENCE TO RELATED APPLICATION

This application is based upon and claims the benefit of priority from Japanese Patent Application No. 2018-037103 filed on Mar. 2, 2018, the contents of which are incorporated herein by reference.

BACKGROUND OF THE INVENTION

Field of the Invention

The present invention relates to a vehicle control device adapted to automatically drive or provide driving assistance to a host vehicle.

Description of the Related Art

In the case that two travel paths are connected (including intersecting and merging travel paths), a priority relationship between the travel paths is determined based on a traffic regulation. For example, when a first vehicle travels on a first travel path having a high priority, a second vehicle travels on a second travel path having a lower priority, and the first vehicle and the second vehicle approach toward one another substantially at the same time at a connecting position between the first travel path and the second travel path, the second vehicle is required to decelerate or come to a stop, and allow the first vehicle to pass through the connecting position first. For this reason, it is necessary for an occupant of the second vehicle to recognize the traffic regulation in advance by way of a road sign or the like.

In Japanese Patent No. 4225189, a device is disclosed in which, based on information acquired from a road sign or the like at the connecting position between a first travel path on which a host vehicle (user's own vehicle) travels and a second travel path on which another vehicle travels, a priority relationship between the first travel path and the second travel path is determined, and a notification of the determination result is issued with respect to an occupant of the host vehicle.

SUMMARY OF THE INVENTION

In Japanese Patent No. 4225189, in the event that an occupant of the other vehicle does not recognize the traffic regulation, and the priority of the second travel path is low, a situation may occur in which the other vehicle approaches the connecting position without decelerating. In such a case, in an automatically driven vehicle which has been developed in recent years, there is a possibility of the vehicle executing large scale braking in order to avoid the sudden approach of the other vehicle, which leads to a concern that riding comfort will be deteriorated. For this reason, it is preferable to perform a vehicle control beforehand, and thereby avoid the host vehicle and the other vehicle approaching one another.

The present invention has been devised taking into consideration the aforementioned problem, and has the object of providing a vehicle control device which is capable of preventing a host vehicle and another vehicle from approaching one another, even in the case that an occupant of the other vehicle does not recognize the traffic regulation.

A vehicle control device according to the present invention comprises an external environment recognition unit adapted to recognize a state around a periphery of a host vehicle, a determination unit which, in the case that the external environment recognition unit recognizes a first lane in which the host vehicle travels, a second lane that connects with the first lane, another vehicle traveling in the second lane, and a traffic regulation which determines that a priority of the first lane is higher than a priority of the second lane, is adapted to determine a state in which the other vehicle is in compliance with the traffic regulation, a decision unit which, in the case it is determined on the basis of a determination result of the determination unit that the other vehicle is not complying with the traffic regulation, decides to carry out at least one of a travel control in which a travel position of the host vehicle is moved in a direction of a side opposite to the second lane, and a travel control in which acceleration is not performed, and a vehicle control unit adapted to perform a travel control for the host vehicle on the basis of the decision result of the decision unit.

In accordance with the above-described configuration, by performing at least one of the travel control in which the travel position of the host vehicle is moved in the direction of the side opposite to the second lane, and the travel control in which acceleration is not performed, even in the case that an occupant of the other vehicle does not recognize the traffic regulation, the host vehicle and the other vehicle can be prevented from approaching one another. Therefore, at the position where the first lane and the second lane connect, the host vehicle is not required to brake significantly in order to avoid the approach of the other vehicle, and the riding comfort of the host vehicle is not deteriorated.

In the present invention, the decision unit may decide to carry out a travel control in which the travel position of the host vehicle is moved to a third lane which is adjacent to the first lane, and which is positioned in the direction of the side opposite to the second lane.

In accordance with the above-described configuration, by causing the host vehicle to move into the third lane, it is possible to prevent the host vehicle and the other vehicle from approaching one another. Further, the flow of traffic can be maintained.

In the present invention, there may further be provided a map storage unit adapted to store map information including information indicative of the traffic regulation, wherein, in the case that the external environment recognition unit recognizes the traffic regulation on the basis of the map information, and regardless of the presence or absence of the other vehicle, the decision unit may decide to carry out a travel control in which the travel position of the host vehicle is moved to a third lane which is adjacent to the first lane, and which is positioned in the direction of the side opposite to the second lane.

In accordance with the above-described configuration, by causing the host vehicle to move into the third lane, it is possible to prevent the host vehicle and the other vehicle from approaching one another. Further, the flow of traffic can be maintained. Furthermore, since the map information is used, the host vehicle is capable of being moved with a margin of allowance.

In the present invention, the decision unit may decide to offset the travel position of the host vehicle from a center of the first lane in the direction of the side opposite to the second lane.

In accordance with the above-described configuration, by offsetting the travel position of the host vehicle, it is possible to prevent the host vehicle and the other vehicle from approaching one another. Further, the flow of traffic can be maintained.

In the present invention, there may further be provided a camera adapted to capture image information of an indicator that indicates the traffic regulation, wherein, in the case that the external environment recognition unit recognizes a plurality of the indicators on the basis of the image information, the determination unit may determine that a travel segment between the indicators is a compliance segment in which the other vehicle is to comply with the traffic regulation, and may determine a state in which the other vehicle is in compliance with the traffic regulation in the compliance segment.

In accordance with the above-described configuration, by setting such a compliance segment, it is possible to appropriately determine whether or not the other vehicle is complying with the traffic regulation.

In the present invention, the determination unit may determine, as the state in which the other vehicle is in compliance with the traffic regulation, a degree of compliance indicating a degree to which the other vehicle is complying with the traffic regulation, and in the case that the degree of compliance is less than a threshold value, the decision unit may decide to carry out at least one of the travel control in which the travel position of the host vehicle is moved in the direction of the side opposite to the second lane, and the travel control in which acceleration is not performed.

In accordance with the above-described configuration, by determining the degree of compliance, it is possible to objectively determine whether or not the other vehicle is complying with the traffic regulation.

In the present invention, there may further be provided a camera adapted to capture image information of an indicator that indicates the traffic regulation, and a map storage unit adapted to store map information including information indicative of the traffic regulation, wherein, in the case that the external environment recognition unit recognizes the traffic regulation on the basis of the image information, the decision unit may set the threshold value to be greater than in the case that the traffic regulation is recognized on the basis of the map information.

In accordance with the above-described configuration, by suitably changing the threshold value, it is possible to appropriately determine whether or not the other vehicle is complying with the traffic regulation.

In the present invention, the determination unit may determine as the degree of compliance a velocity reducing rate or an amount of deceleration of the other vehicle.

In the case that the traffic regulation is recognized in which the priority of the first lane is higher than the priority of the second lane, the other vehicle is made to decelerate or stop in front of the position where the first lane and the second lane connect. In accordance with the above described configuration, by having the degree of compliance be a velocity reducing rate or an amount of deceleration of the other vehicle, it is possible to accurately determine the degree of compliance.

According to the present invention, it is possible to prevent a host vehicle and another vehicle from approaching one another, even in the case that an occupant of the other vehicle does not recognize the traffic regulation.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a vehicle control device according to the present invention will be presented and described in detail below with reference to the accompanying drawings.

1. Configuration of Host Vehicle 10

Figure 1:
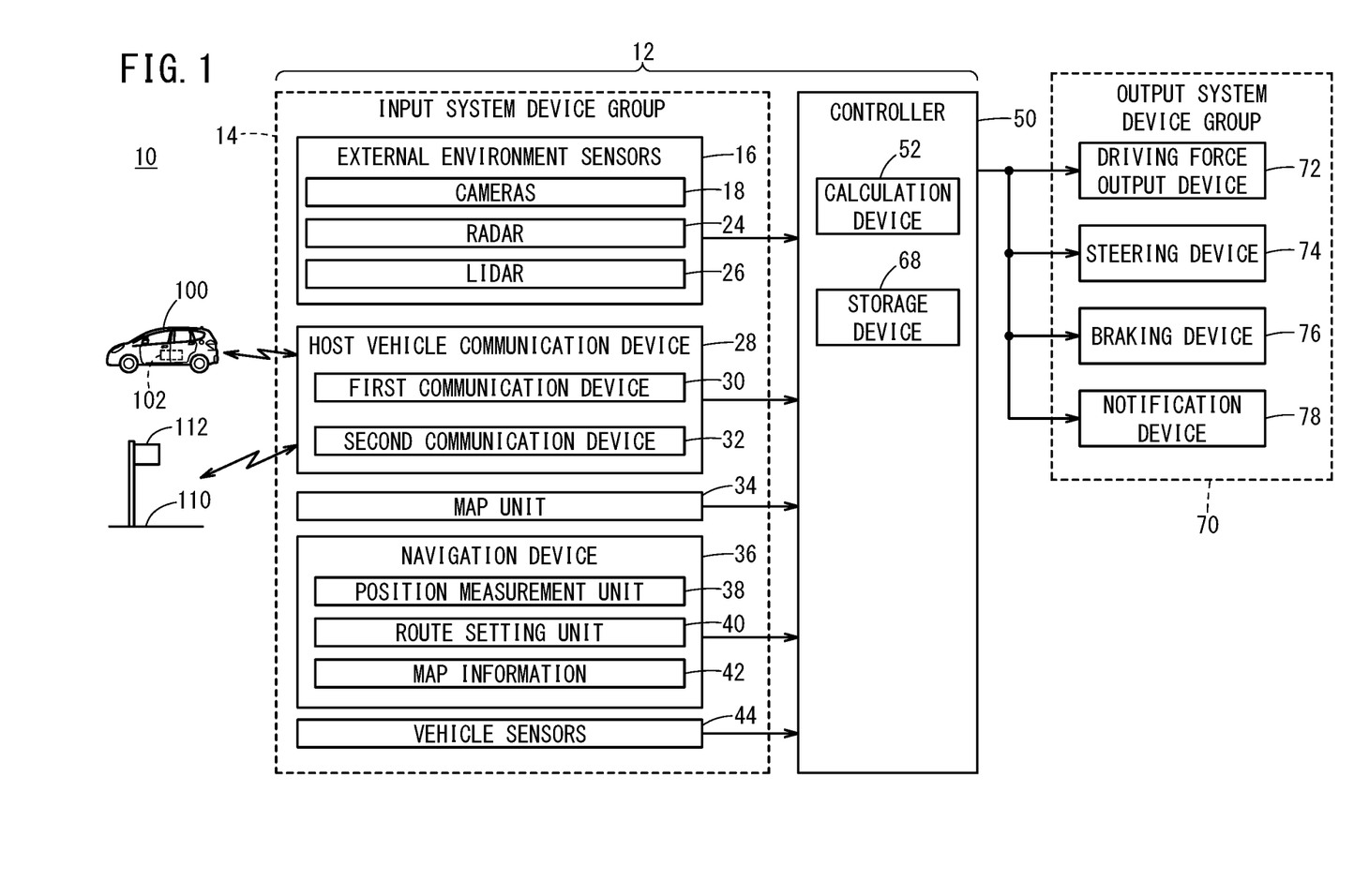
FIG. 1 is a block diagram of a host vehicle equipped with a vehicle control device according to the present embodiment.

As shown in FIG. 1, the host vehicle 10 is equipped with an input system device group 14 which acquires or stores various information, a controller 50 to which information that is output from the input system device group 14 is input, and an output system device group 70 which is operated in response to various instructions output from the controller 50. A vehicle control device 12 according to the present embodiment includes the input system device group 14 and the controller 50. The host vehicle 10 is an automatically driven vehicle (including a fully automatically driven vehicle) in which a travel control is performed by the controller 50, or a driving assisted vehicle in which portions of the travel control are assisted.

[1.1. Input System Device Group 14]

In the input system device group 14, there are included external environment sensors 16, a host vehicle communication device 28, a map unit 34, a navigation device 36, and vehicle sensors 44. The external environment sensors 16 detect the state of the surrounding periphery (external environment) of the host vehicle 10. Among the external environment sensors 16, there are included a plurality of cameras 18 that capture images of the external environment, a plurality of radar devices 24 and one or more LIDAR devices 26 that detect the distance between the host vehicle 10 and other surrounding objects, as well as the relative velocity between the host vehicle 10 and the surrounding objects. In the host vehicle communication device 28, there are included a first communication device 30 and a second communication device 32. The first communication device 30 performs inter-vehicle communications with other vehicle communication devices 102 provided in other vehicles 100, and acquires external environmental information including information (a type of car, a travel state, a traveling position, etc.) of the other vehicles 100. The second communication device 32 performs road-to-vehicle communications with roadside communication devices 112 provided in an infrastructure such as a road 110 or the like, and acquires external environmental information including road information (information in relation to traffic signals, traffic congestion information, and the like). The map unit 34 stores high precision map information including information such as the number of lanes, the lane type, the lane width, and the like. The navigation device 36 comprises a positioning unit 38 that measures the position of the host vehicle 10 by way of satellite navigation and/or autonomous navigation, map information 42, and a route setting unit 40 which sets a planned route from the position of the host vehicle 10 to a destination on the basis of the map information 42. Hereinafter, unless otherwise specified, the high precision map stored in the map unit 34, and the map information 42 stored in the navigation device 36 will be collectively referred to as the map information 42. The vehicle sensors 44 detect the travel state of the host vehicle 10. The vehicle sensors 44 include a vehicle velocity sensor, an acceleration sensor, a yaw rate sensor, an inclination sensor, a travel distance sensor (mileage sensor) and the like, none of which are shown.

[1.2. Output System Device Group 70]

In the output system device group 70, there are included a driving force output device 72, a steering device 74, a braking device 76, and a notification device 78. The driving force output device 72 includes a driving force output ECU and a drive source such as an engine or a driving motor. The driving force output device 72 generates a driving force in accordance with an operation of an accelerator pedal performed by the vehicle occupant, or a driving control instruction output from the controller 50. The steering device 74 includes an electric power steering system (EPS) ECU and an EPS actuator. The steering device 74 generates a steering force in accordance with an operation of the steering wheel performed by the vehicle occupant, or a steering control instruction output from the controller 50. The braking device 76 includes a brake ECU and a brake actuator. The braking device 76 generates a braking force in accordance with an operation of the brake pedal performed by the vehicle occupant, or a braking control instruction output from the controller 50. The notification device 78 includes a notification ECU, and an information transmission device (a display device, an audio device, a haptic device, etc.). The notification device 78 issues a notification with respect to the vehicle occupant in accordance with a notification instruction output from the controller 50 or another ECU.

[1.3. Controller 50]

Figure 2:
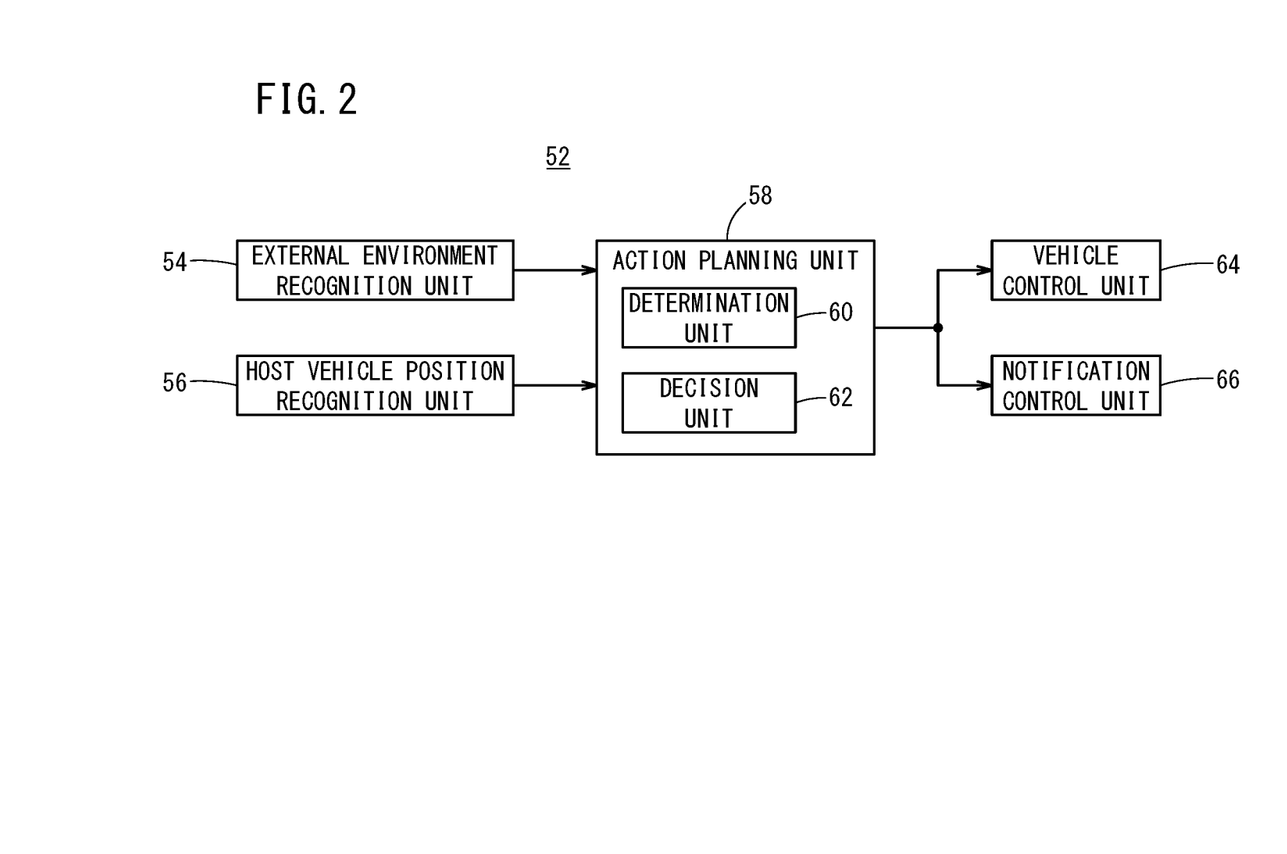
FIG. 2 is a functional block diagram of a computation device.

The controller 50 comprises an ECU, and includes a computation device 52 such as a processor, and a storage device 68 such as a ROM and a RAM. The controller 50 realizes various functions by the computation device 52 executing programs stored in the storage device 68. As shown in FIG. 2, the computation device 52 functions as an external environment recognition unit 54, a host vehicle position recognition unit 56, an action planning unit 58, a vehicle control unit 64, and a notification control unit 66.

On the basis of information output from the external environment sensors 16, the host vehicle communication device 28, the map unit 34, and the navigation device 36, the external environment recognition unit 54 recognizes the state of the periphery around the host vehicle 10. For example, based on the image information acquired by the cameras 18, the information acquired by the radar devices 24 and the LIDAR devices 26, and the external environmental information acquired by the first communication device 30, the external environment recognition unit 54 recognizes the existence, the position, the size, the type, and the forward traveling direction of other vehicles 100 which are traveling or stopped in the vicinity of the host vehicle 10, together with recognizing the distance and the relative velocity between the host vehicle 10 and the other vehicles 100. Further, on the basis of the image information acquired by the cameras 18, the information acquired by the radar devices 24 and the LIDAR devices 26, the map information 42, and the external environmental information acquired by the second communication device 32, the external environment recognition unit 54 recognizes the shape, the type, and the position of recognition target objects included within the road environment. Further, on the basis of the image information acquired by the cameras 18 or the external environmental information acquired by the second communication device 32, the external environment recognition unit 54 recognizes the signals (a forward traveling permissible state, a forward traveling prohibited state) that are indicated by the traffic signals.

Based on information output from the map unit 34 and the navigation device 36, the host vehicle position recognition unit 56 recognizes the position of the host vehicle 10.

The action planning unit 58 plans an optimal action for the host vehicle 10, on the basis of recognition results from the external environment recognition unit 54 and the host vehicle position recognition unit 56, and detection information and stored information from the input system device group 14. The action planning unit 58 includes a determination unit 60 and a decision unit 62. Based on the behavior of the other vehicle 100, the determination unit 60 determines a state, and more specifically a compliance state, in which the other vehicle 100 is in compliance with the traffic regulation. For example, as the compliance state, the determination unit 60 determines a degree of compliance which indicates a degree to which the other vehicle 100 is complying with the traffic regulation. In the case it is determined that the other vehicle 100 is not in compliance with the traffic regulation on the basis of the determination result (compliance state) of the determination unit 60, the decision unit 62 decides to carry out at least one of a travel control in which the travel position of the host vehicle 10 is moved in the direction of the side opposite to the second lane 132, and a travel control in which acceleration is not performed. For example, in the case it is determined that the other vehicle 100 is not in compliance with the traffic regulation on the basis of the determination result of the determination unit 60, the decision unit 62 decides to carry out at least one of the aforementioned travel controls. In the case that the degree of compliance determined by the determination unit 60 is less than the threshold value, the decision unit 62 decides to carry out at least one of the travel control in which the travel position of the host vehicle 10 is moved in the direction of the side opposite to the second lane 132, and the travel control in which acceleration is not performed. In addition, when the travel control is carried out, a travel trajectory and a target velocity are generated.

The vehicle control unit 64 controls the output system device group 70 on the basis of the actions planned by the action planning unit 58. For example, the vehicle control unit 64 calculates steering command values corresponding to the target travel trajectory generated by the action planning unit 58, and acceleration/deceleration command values in accordance with the target velocity, and outputs control instructions with respect to the driving force output device 72, the steering device 74, and the braking device 76.

The notification control unit 66 outputs notification instructions to the notification device 78 based on the notification actions planned by the action planning unit 58.

Apart from the various programs executed by the computation device 52, the storage device 68 shown in FIG. 1 stores numerical values used for comparisons and determinations made in the respective processes.

2. Operations of the Vehicle Control Device 12

Figure 3:
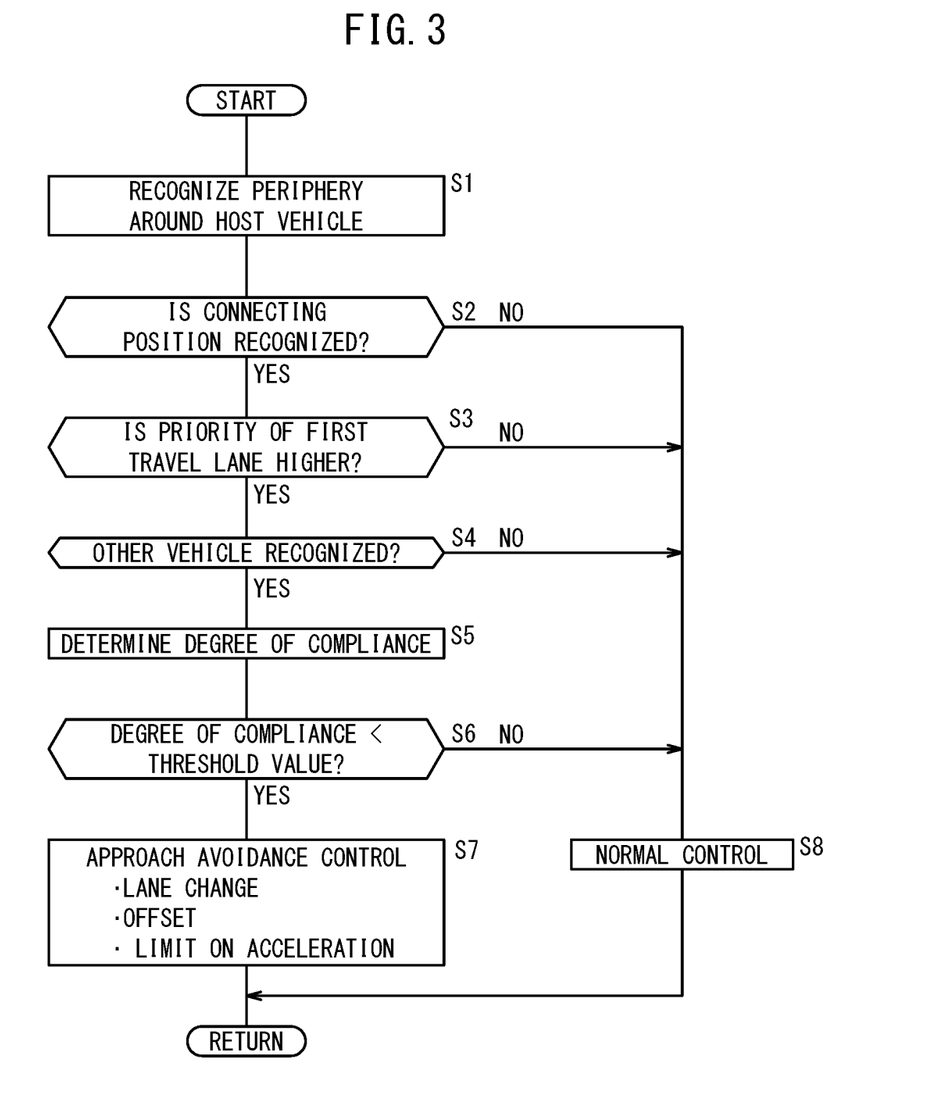
FIG. 3 is a flowchart of main processing steps performed by the vehicle control device according to the present embodiment.
Figure 4:
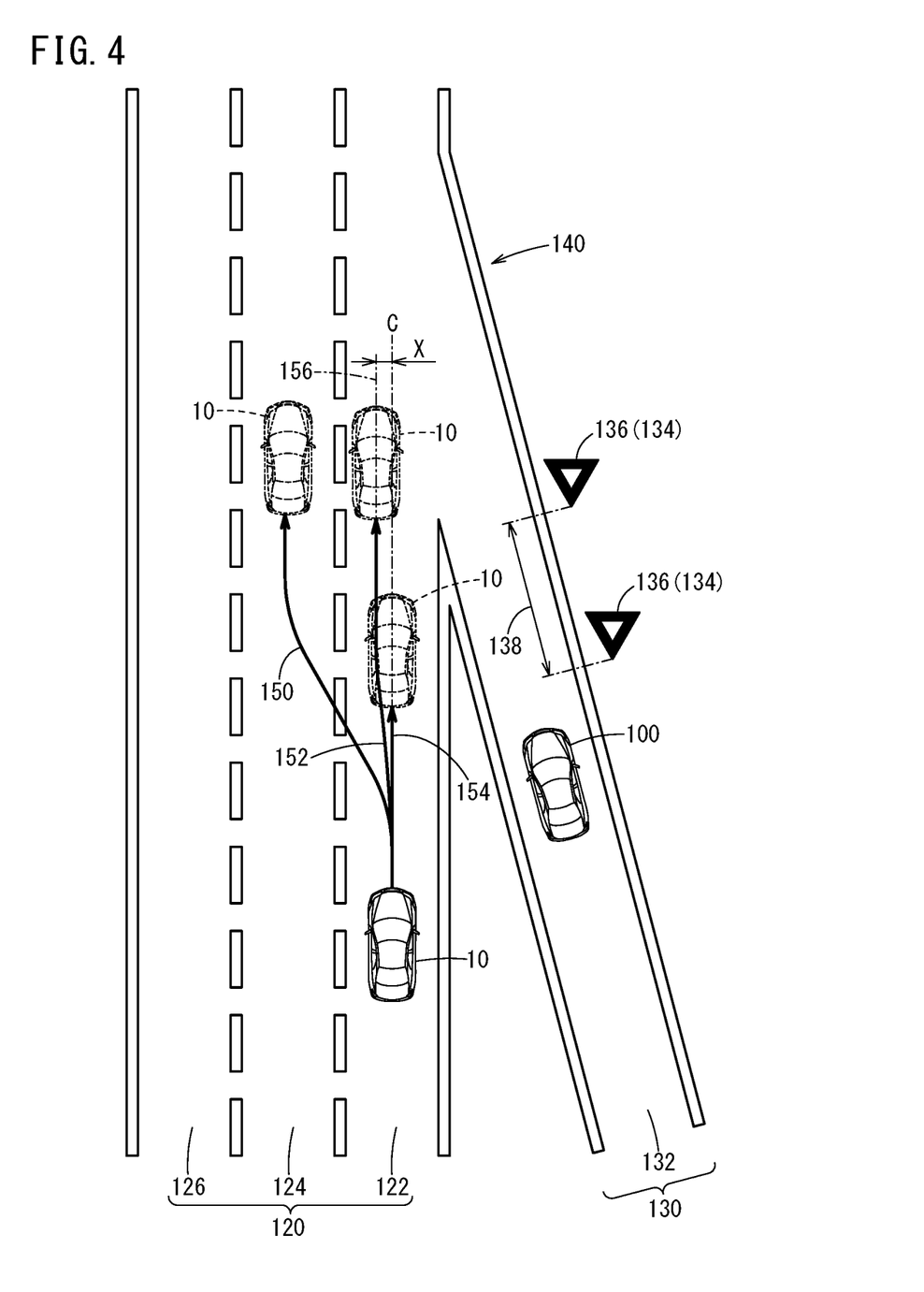
FIG. 4 is a diagram for explaining the vehicle control performed by the host vehicle.

The vehicle control device 12 will now be described with reference to FIG. 3. The process shown in FIG. 3 is executed at predetermined time intervals during a period in which the vehicle control device 12 performs automated driving. Moreover, in the following description, as shown in FIG. 4, a situation is assumed in which the two travel paths are connected (which includes intersecting or merging with one another). In FIG. 4, a first travel path 120 includes three travel lanes (a first lane 122, a third lane 124, and a fourth lane 126) which have the same forward traveling direction. A second travel path 130 has one travel lane (the second lane 132). The first travel path 120 and the second travel path 130 connect with one another at a connecting position 140. More specifically, the second lane 132 of the second travel path 130 merges with the first lane 122 located on a rightmost side of the first travel path 120. Two indicators 134 are installed on the side of the second travel path 130 and in front of the connecting position 140. The indicators 134 are road signs 136 (temporary stop, yield, etc.) which are indicative of a traffic regulation in which the priority of the first travel path 120 is higher than the priority of the second travel path 130. The host vehicle 10 travels in the first lane 122 and the other vehicle 100 travels in the second lane 132.

In step S1, the external environment recognition unit 54 recognizes the state of the periphery around the host vehicle 10 on the basis of the latest information output from the input system device group 14.

In the case that the external environment recognition unit 54 recognizes the connecting position 140 within a predetermined distance in the forward traveling direction of the host vehicle 10 (step S2: YES), the process transitions to step S3. On the other hand, in the case that the connecting position 140 is not recognized (step S2: NO), the process transitions to step S8.

Based on at least one of the image information acquired by the cameras 18, the external environmental information acquired by the second communication device 32, and information related to the priority included in the map information 42, the external environment recognition unit 54 recognizes the traffic regulation by which the priority of the travel paths is determined. In the case that the traffic regulation is recognized on the basis of the image information, the external environment recognition unit 54 identifies the road signs 136 using an image recognition technique such as template matching. For example, as shown in FIG. 4, in the case that road signs 136 which are installed on the side of the second travel path 130 or road signs 136 facing toward the second travel path 130 are identified, the external environment recognition unit 54 recognizes that the priority of the first travel path 120 is higher. In contrast thereto, in the case that road signs 136 which are installed on the side of the first travel path 120 or road signs 136 facing toward the first travel path 120 are identified, the external environment recognition unit 54 recognizes that the priority of the second travel path 130 is higher. Moreover, in the case that the external environment recognition unit 54 is incapable of recognizing the traffic regulation by which the priority is determined on the basis of any one of the image information, the external environmental information, and the map information 42, the external environment recognition unit 54 estimates the priority on the basis of the types of the travel paths, the number of lanes, the widths of the travel paths, and the like. In the case that the external environment recognition unit 54 recognizes that the priority of the first travel path 120 is higher (step S3: YES), the process transitions to step S4. On the other hand, in the case that the external environment recognition unit 54 recognizes that the priority of the second travel path 130 is higher (step S3: NO), the process transitions to step S8.

In the case that the external environment recognition unit 54 recognizes the other vehicle 100 that is traveling in the second travel path 130 (step S4: YES), the process transitions to step S5. On the other hand, in the case that the external environment recognition unit 54 does not recognize the other vehicle that is traveling in the second travel path 130 (step S4: NO), the process transitions to step S8. For example, from among other vehicles 100 traveling in the second travel path 130, the external environment recognition unit 54 recognizes another vehicle 100 which is capable of approaching or coming into proximity to the host vehicle 10 at the connecting position 140. Whether or not there is a possibility of approaching can be determined by calculating predicted times of arrival of the host vehicle 10 and the other vehicle 100 at the connecting position 140, and determining whether or not a time difference between both predicted times falls within a predetermined time period.

Upon transitioning from step S4 to step S5, the determination unit 60 determines a degree of compliance which indicates a degree to which the other vehicle 100 is complying with the traffic regulation. The determination unit 60 determines a degree of deceleration of the other vehicle 100 as the degree of compliance. For example, a deceleration of the other vehicle 100, or an amount of deceleration within a predetermined time period or within a predetermined distance is determined. The deceleration or the amount of deceleration can be determined on the basis of information acquired by the radar devices 24 or the LIDAR devices 26, or alternatively, based on information that the first communication device 30 acquires from the other vehicle 100.

In step S6, the decision unit 62 compares the degree of compliance determined in step S5 with a degree of compliance threshold value that is stored in the storage device 68. For example, in the case that an occupant of the other vehicle 100 does not recognize that the priority of the first travel path 120 is higher than the priority of the second travel path 130, the deceleration or the amount of deceleration of the other vehicle 100 is small. If the deceleration or the amount of deceleration, which serves as the degree of compliance, is less than the threshold value (step S6: YES), the process transitions to step S7. On the other hand, in the case that an occupant of the other vehicle 100 recognizes that the priority of the first travel path 120 is higher than the priority of the second travel path 130, the deceleration or the amount of deceleration of the other vehicle 100 is large. If the deceleration or the amount of deceleration, which serves as the degree of compliance, is greater than or equal to the threshold value (step S6: NO), the process transitions to step S8.

Upon transitioning from step S6 to step S7, the decision unit 62 decides to perform various controls (approach avoidance controls) in order to avoid the host vehicle 10 and the other vehicle 100 from approaching one another in advance. For example, the decision unit 62 may decide to carry out the first travel control, and specifically, a lane change control or an offset control, in which the travel position of the host vehicle 10 is moved in the direction of the side opposite to the second lane 132. Further, the decision unit 62 may decide to carry out the second travel control (limit on acceleration) in which at least acceleration is not performed.

In the case of performing the lane change control, the decision unit 62 decides to cause the travel position of the host vehicle 10 to be moved into the third lane 124 which is adjacent to the first lane 122, and which is positioned in the direction of the side opposite to the second lane 132. At this time, on the condition that the external environment recognition unit 54 recognizes that a vehicle does not exist within a predetermined range of the third lane 124, the decision unit 62 generates a first travel trajectory 150 and a target velocity in order to cause the travel position of the host vehicle 10 to be moved into the third lane 124.

In the case of performing the offset control, the decision unit 62 decides that a center position 156 in the widthwise direction of the host vehicle 10 is to be offset from a center C in the widthwise direction of the first lane 122 in the direction opposite to the second lane 132. At this time, the decision unit 62 sets an offset amount X to a predetermined value or a variable value that is set in accordance with the situation at that time, and generates a second travel trajectory 152 and a target velocity in order to cause the center position 156 of the host vehicle 10 to be moved to the offset position. The variable value can be set in accordance with the distance from the host vehicle 10 to the connecting position 140, the distance from the other vehicle 100 to the connecting position 140, the travel velocity of the host vehicle 10, and the travel velocity of the other vehicle 100, etc.

In the case of performing the limit on acceleration, the decision unit 62 generates a third travel trajectory 154 and a target velocity required in order to cause the host vehicle 10 to travel at a constant velocity until the other vehicle 100 reaches the connecting position 140, or until the other vehicle 100 passes through the connecting position 140. However, in the case it is determined that coming into proximity to the other vehicle 100 cannot be avoided even if the host vehicle 10 travels at the constant velocity, the decision unit 62 generates a third travel trajectory 154 and a target velocity required in order to cause the host vehicle 10 to travel at a decelerated travel velocity in which the host vehicle 10 is made to decelerate at a predetermined velocity reducing rate. Instead of the predetermined velocity reducing rate, a predetermined amount of deceleration or a predetermined deceleration target velocity may be set. The second travel control may also be performed in combination with the first travel control.

The vehicle control unit 64 calculates an acceleration/deceleration command value and a steering command value required in order to cause the host vehicle 10 to travel at the target velocity along the travel trajectories (the first travel trajectory 150, the second travel trajectory 152, and the third travel trajectory 154), and outputs the command values to the output system device group 70. The driving force output device 72, the steering device 74, and the braking device 76 operate in accordance with the instructions output from the vehicle control unit 64.

Upon transitioning to step S8 from any one of step S2, step S3, step S4, or step S6, the decision unit 62 decides to perform a normal control for the host vehicle 10. In the case of transitioning from step S2 to step S8, the connecting position 140 does not exist in front of the host vehicle 10. At this time, the decision unit 62 decides to perform the normal control. In the case of transitioning from step S3 to step S8, the first travel path 120 has a lower priority than the second travel path 130. At this time, the decision unit 62 decides to perform the normal control according to the traffic regulation (a travel control to perform deceleration, temporary stopping, etc., and give the right of way to the other vehicle 100). In the case of transitioning from step S4 to step S8, the other vehicle 100 is not traveling in the second travel path 130. Therefore, the host vehicle 10 and the other vehicle 100 do not approach one another. At this time, the decision unit 62 decides to perform the normal control. In the case of transitioning from step S6 to step S8, there is a high possibility that the other vehicle 100 that is traveling in the second travel path 130 is complying with the traffic regulation, and it is anticipated that the other vehicle 100 will give the right of way to the host vehicle 10. At this time, the decision unit 62 decides to perform the normal control. The decision unit 62 generates travel trajectories and target velocities corresponding to each of the normal controls.

The vehicle control unit 64 calculates an acceleration/deceleration command value and a steering command value required in order to cause the host vehicle 10 to travel at the target velocity along the travel trajectories, and outputs the command values to the output system device group 70. The driving force output device 72, the steering device 74, and the braking device 76 operate in accordance with the instructions output from the vehicle control unit 64.

3. Modifications

In step S6 shown in FIG. 3, the decision unit 62 uses a predetermined value as the threshold value for the degree of compliance. Instead of this feature, the threshold value for the degree of compliance may be a variable value. In this case, a map linking the input information and the threshold value (output information) may be stored in the storage device 68. As such input information, there can be utilized the distance from the host vehicle 10 to the connecting position 140, the distance from the other vehicle 100 to the connecting position 140, the travel velocity of the host vehicle 10, and the travel velocity of the other vehicle 100, etc. In this case, the threshold value is made greater as the distance becomes shorter, or as the travel velocity becomes greater.

Before recognizing the existence of the connecting position 140 on the basis of the image information, in the case that the external environment recognition unit 54 recognizes the connecting position 140 on the basis of the map information 42, and further recognizes that the first travel path 120 has a higher priority than the second travel path 130, then regardless of the presence or absence of the other vehicle 100 traveling in the second lane 132, a lane change control or an offset control may be carried out in advance.

The determination unit 60 may set a segment for determining the state in which the other vehicle 100 is complying with the traffic regulation. For example, there are cases in which the road signs 136 are installed in a plurality along the second travel path 130. In the case that the road signs 136 indicate a traffic regulation by which the priority of the first travel path 120 is higher than that of the second travel path 130, and in the case that an occupant of the other vehicle 100 complies with the road signs 136, the other vehicle 100 does not perform at least acceleration within the segment from the installation position of the first road sign 136 to the installation position of the last road sign 136. Thus, in the case that the external environment recognition unit 54 recognizes the plurality of road signs 136 on the basis of the image information, the determination unit 60 sets the travel segment between the indicators 134 as a compliance segment 138 in which the other vehicle 100 is to comply with the traffic regulation. In addition, the determination unit 60 determines a state in which the other vehicle 100 is in compliance with the traffic regulation in the compliance segment 138.

In certain cases, the other vehicle 100 may not include the map information 42. In this case, the occupant of the other vehicle 100 can acquire the information concerning the traffic regulation only from the road signs 136 that are installed on the side of the second travel path 130. Stated otherwise, in the case that such road signs 136 are not installed, the occupant of the other vehicle 100 is incapable of recognizing the traffic regulation by which the first travel path 120 has a higher priority than the second travel path 130. From such a standpoint, the decision unit 62 may more strictly determine whether or not the other vehicle 100 is complying with the traffic regulation in a case where the external environment recognition unit 54 recognizes the traffic regulation (the road signs 136) on the basis of the image information, compared to a case where the traffic regulation is recognized based on the map information 42. Specifically, the threshold value for the degree of compliance may be increased. In the case of determining the degree of compliance with a velocity reducing rate, the threshold value is changed from a first velocity reducing rate to a second velocity reducing rate (which is greater than the first velocity reducing rate). In the case of determining the degree of compliance by an amount of deceleration, the threshold value is changed from a first amount of deceleration to a second amount of deceleration (which is greater than the first amount of deceleration).

In addition to the road signs 136, the external environment recognition unit 54 is capable of recognizing road markings and traffic signals that indicate the priorities.

In the embodiment described above, the state in which the other vehicle 100 is in compliance with the traffic regulation is determined by the degree of compliance, and by comparing the degree of compliance with a threshold value, a determination is made as to whether or not the other vehicle 100 is complying with the traffic regulation. Instead of this feature, the state in which the other vehicle is in compliance with the traffic regulation may be determined simply by whether or not the other vehicle 100 is decelerating, and in the case of decelerating, it may be determined that the other vehicle 100 is complying with the traffic regulation.

4. Summary of the Present Invention

The vehicle control device 12 is equipped with the external environment recognition unit 54 that recognizes the state around the periphery of the host vehicle 10, the determination unit 60 which, in the case that the external environment recognition unit 54 recognizes the first lane 122 in which the host vehicle 10 travels, the second lane 132 that connects with the first lane 122, the other vehicle 100 traveling in the second lane 132, and the traffic regulation which determines that a priority of the first lane 122 is higher than a priority of the second lane 132, determines a state in which the other vehicle 100 is in compliance with the traffic regulation, the decision unit 62 which, in the case it is determined on the basis of the determination result of the determination unit 60 that the other vehicle 100 is not complying with the traffic regulation, decides to carry out at least one of a travel control in which a travel position of the host vehicle 10 is moved in a direction of a side opposite to the second lane 132, and a travel control in which acceleration is not performed, and a vehicle control unit 64 that performs a travel control for the host vehicle 10 on the basis of the decision result of the decision unit 62.

In accordance with the above-described configuration, by performing at least one of the travel control in which the travel position of the host vehicle 10 is moved in the direction of the side opposite to the second lane 132, and the travel control in which acceleration is not performed, even in the case that an occupant of the other vehicle 100 does not recognize the traffic regulation, the host vehicle 10 and the other vehicle 100 can be prevented from approaching one another. Therefore, at the connecting position 140 where the first lane 122 and the second lane 132 connect, the host vehicle 10 is not required to brake significantly in order to avoid the approach of the other vehicle 100, and the riding comfort of the host vehicle 10 is not deteriorated.

In the present invention, the decision unit 62 decides to carry out a travel control in which the travel position of the host vehicle 10 is moved to the third lane 124 which is adjacent to the first lane 122, and which is positioned in the direction of the side opposite to the second lane 132.

In accordance with the above-described configuration, by causing the host vehicle 10 to move into the third lane 124, it is possible to prevent the host vehicle 10 and the other vehicle 100 from approaching one another. Further, the flow of traffic can be maintained.

The vehicle control device 12 is further equipped with the navigation device 36 (map storage unit) or the map unit 34 (map storage unit), which stores the map information 42 including information indicative of the traffic regulation. In the case that the external environment recognition unit 54 recognizes the traffic regulation on the basis of the map information 42, regardless of the presence or absence of the other vehicle 100, the decision unit 62 decides to carry out the travel control in which the travel position of the host vehicle 10 is moved to the third lane 124 which is adjacent to the first lane 122, and which is positioned in the direction of the side opposite to the second lane 132.

In accordance with the above-described configuration, by causing the host vehicle 10 to move into the third lane 124, it is possible to prevent the host vehicle 10 and the other vehicle 100 from approaching one another. Further, the flow of traffic can be maintained. Furthermore, since the map information 42 is used, the host vehicle 10 is capable of being moved with a margin of allowance.

The decision unit 62 decides to offset the travel position of the host vehicle 10 from the center C of the first lane 122 in the direction of the side opposite to the second lane 132.

In accordance with the above-described configuration, by offsetting the travel position of the host vehicle 10, it is possible to prevent the host vehicle 10 and the other vehicle 100 from approaching one another. Further, the flow of traffic can be maintained.

The vehicle control device 12 is further equipped with the cameras 18 which acquire image information by capturing images of the indicators 134 that indicate the traffic regulation. In the case that the external environment recognition unit 54 recognizes the plurality of indicators 134 on the basis of the image information, the determination unit 60 determines that a travel segment between the indicators 134 is a compliance segment 138 in which the other vehicle 100 is to comply with the traffic regulation, and determines a state in which the other vehicle 100 is in compliance with the traffic regulation in the compliance segment 138.

In accordance with the above-described configuration, by setting such a compliance segment 138, it is possible to appropriately determine whether or not the other vehicle 100 is complying with the traffic regulation.

As a state by which the other vehicle 100 is in compliance with the traffic regulation, the determination unit 60 determines a degree of compliance which indicates a degree to which the other vehicle 100 is complying with the traffic regulation. In the case that the degree of compliance is less than a threshold value, the decision unit 62 decides to carry out at least one of the travel control in which the travel position of the host vehicle 10 is moved in the direction of the side opposite to the second lane 132, and the travel control in which acceleration is not performed.

In accordance with the above-described configuration, by determining the degree of compliance, it is possible to objectively determine whether or not the other vehicle 100 is complying with the traffic regulation.

In the case that the external environment recognition unit 54 recognizes the traffic regulation on the basis of the image information, the decision unit 62 sets the threshold value to be greater than in the case that the traffic regulation is recognized on the basis of the map information 42.

In accordance with the above-described configuration, by suitably changing the threshold value, it is possible to appropriately determine whether or not the other vehicle 100 is complying with the traffic regulation.

The determination unit 60 determines as the degree of compliance a velocity reducing rate or an amount of deceleration of the other vehicle 100.

In the case that the occupant of the other vehicle 100 recognizes the traffic regulation by which the priority of the first lane 122 is higher than the priority of the second lane 132, the other vehicle 100 is made to decelerate or stop in front of the connecting position 140 where the first lane 122 and the second lane 132 connect. In accordance with the above described configuration, by having the degree of compliance be a velocity reducing rate or an amount of deceleration of the other vehicle 100, it is possible to accurately determine the degree of compliance.

The vehicle control device according to the present invention is not limited to the above-described embodiment, and it goes without saying that various additional or alternative configurations could be adopted therein without departing from the essence and gist of the present invention.

What is claimed is:

1. A vehicle control device, comprising:
    a processor;
    an external environment sensor that provides sensor data of a state around a periphery of a host vehicle; and
    a memory that stores instructions for controlling the processor to:
        recognize, based on the sensor data from the external environment sensor, a first lane in which the host vehicle travels, a second lane that connects with the first lane, another vehicle traveling in the second lane;
        recognize whether a priority relationship exists between the first lane and the second lane based on a traffic regulation that establishes a priority of the first lane with respect to a priority of the second lane;
        recognize, based on sensor data from the external environment sensor, whether a behavior of the other vehicle is indicative of prioritizing the host vehicle over the other vehicle;
        determine, in the case it is recognized that the priority of the first lane is not higher than the priority of the second lane or that the behavior of the other vehicle is not indicative of prioritizing the host vehicle over the other vehicle, that an approach avoidance control should be implemented in which at least one of a travel position of the host vehicle is moved in a direction of a side opposite to the second lane, and acceleration is avoided;
        determine, in the case it is recognized that the priority of the first lane is higher than the priority of the second lane and that the behavior of the other vehicle is indicative of prioritizing the host vehicle over the other vehicle, that the approach avoidance control should not be implemented in relation to the other vehicle; and
        perform a travel control for the host vehicle on the basis of the determination that the approach avoidance control should be implemented.

2. The vehicle control device according to claim 1, wherein the memory further stores instructions to cause the processor to decide to carry out a travel control in which the travel position of the host vehicle is moved to a third lane which is adjacent to the first lane, and which is positioned in the direction of the side opposite to the second lane.

3. The vehicle control device according to claim 1, further comprising:
    a map storage unit adapted to store map information including information indicative of the traffic regulation by which the priority relationship is established;
    wherein the memory further stores instructions to cause the processor to decide, in the case that the external environment recognition unit recognizes the traffic regulation on the basis of the map information, regardless of the presence or absence of the other vehicle, to carry out a travel control in which the travel position of the host vehicle is moved to a third lane which is adjacent to the first lane, and which is positioned in the direction of the side opposite to the second lane.

4. The vehicle control device according to claim 1, wherein the memory further stores instructions to cause the processor to decide to offset the travel position of the host vehicle from a center of the first lane in the direction of the side opposite to the second lane.

5. The vehicle control device according to claim 1,
    wherein the external environment sensor comprises a camera adapted to acquire image information by capturing an image of an indicator that indicates the traffic regulation by which the priority relationship is established; and
    wherein the memory further stores instructions to cause the processor to:
        recognize a plurality of the indicators on the basis of the image information,
        determine that a travel segment between the indicators is a compliance segment in which the other vehicle is to comply with the traffic regulation, and
        determine whether the behavior of the other vehicle is indicative of prioritizing the host vehicle over the other vehicle in the compliance segment.

6. The vehicle control device according to claim 1, wherein the memory further includes instructions to cause the processor to:
    determine a degree of compliance indicating a degree to which the other vehicle is complying with the traffic regulation based on the recognized behavior of the other vehicle that is indicative of prioritizing the host vehicle over the other vehicle; and
    in the case that the degree of compliance is greater than a threshold value, decide not to carry out the approach avoidance control.

7. The vehicle control device according to claim 6, further comprising:
    a map storage unit adapted to store map information including information indicative of the traffic regulation;
    wherein the external environment sensor comprises a camera adapted to acquire image information by capturing an image of an indicator that indicates the traffic regulation by which the priority relationship is established; and
    wherein the memory further includes instructions to cause the processor to, in the case that the traffic regulation is recognized on the basis of the image information, set the threshold value to be greater than in the case that the traffic regulation is recognized on the basis of the map information.

8. The vehicle control device according to claim 6, wherein the degree of compliance is determined based on a velocity reducing rate or an amount of deceleration of the other vehicle.

* * * * *